(12) United States Patent
Duplaix et al.

(10) Patent No.: US 7,403,530 B2
(45) Date of Patent: Jul. 22, 2008

(54) SCALABLE ROUTER

(75) Inventors: Jérôme Duplaix, Montreal (CA); Stéphan Goulet, Lachine (CA); Gamini Wickrema, Baie D'Urfé (CA)

(73) Assignee: 4198638 Canada Inc., Montreal, Quebec (CA)

( * ) Notice: Subject to any disclaimer, the term of this patent is extended or adjusted under 35 U.S.C. 154(b) by 764 days.

(21) Appl. No.: 09/915,332

(22) Filed: Jul. 27, 2001

(65) Prior Publication Data

US 2003/0021232 A1 Jan. 30, 2003

(51) Int. Cl.
*H04L 12/56* (2006.01)
(52) U.S. Cl. .................. 370/395.31; 370/392; 709/238
(58) Field of Classification Search .............. 370/236.1, 370/220, 395.31, 395.1–395.72, 386–432, 370/392, 236; 709/238–240
See application file for complete search history.

(56) References Cited

U.S. PATENT DOCUMENTS

| | | | |
|---|---|---|---|
| 5,802,278 A | 9/1998 | Isfeld et al. | |
| 5,889,953 A * | 3/1999 | Thebaut et al. | 709/221 |
| 6,049,524 A * | 4/2000 | Fukushima et al. | 370/220 |
| 6,078,963 A * | 6/2000 | Civanlar et al. | 709/238 |
| 6,310,878 B1 * | 10/2001 | Bodnar et al. | 370/396 |
| 6,370,653 B1 * | 4/2002 | Ichinohe et al. | 714/4 |
| 6,577,634 B1 * | 6/2003 | Tsukakoshi et al. | 370/395.31 |
| 6,643,706 B1 * | 11/2003 | Marques et al. | 709/242 |
| 6,650,642 B1 * | 11/2003 | Sugai et al. | 370/392 |
| 6,820,134 B1 * | 11/2004 | Zinin et al. | 709/238 |
| 6,947,963 B1 * | 9/2005 | Agarwal et al. | 709/201 |
| 7,003,582 B2 * | 2/2006 | Basso et al. | 709/242 |
| 7,068,661 B1 * | 6/2006 | Watt et al. | 370/395.31 |
| 7,240,123 B2 * | 7/2007 | Kamboh et al. | 709/238 |
| 2002/0064132 A1 * | 5/2002 | Akyol et al. | 370/250 |
| 2002/0097730 A1 * | 7/2002 | Langille et al. | 370/401 |
| 2002/0141378 A1 * | 10/2002 | Bays et al. | 370/351 |
| 2003/0014665 A1 * | 1/2003 | Anderson et al. | 713/201 |
| 2005/0249229 A1 * | 11/2005 | Wilkie et al. | 370/422 |

FOREIGN PATENT DOCUMENTS

| | | |
|---|---|---|
| EP | 0 969 630 A1 | 1/2000 |
| EP | 1 111 850 A2 | 6/2001 |

OTHER PUBLICATIONS

Margret N. Gobrial, Evaluation of Border Gateway Protocol in the Tactical environment, IEEE 1996.*
Stephen Kent et al, Secure Border Gateway Protocol, Apr. 2000.*
Aweya James: "On the design of IP routres Part 1: Router Architecture" Journal of Systems Architecture, vol. 46, No. 6, Apr. 2000, pp. 483-511, XP002237071.

(Continued)

*Primary Examiner*—Aung S. Moe
*Assistant Examiner*—Habte Mered

(57) ABSTRACT

A router with a routing layer that supports single or multiple routing protocols. The routing layer has at least two routing protocol computing entities, namely a first and a second routing protocol computing entities. Each routing protocol computing entity includes a CPU, a data storage medium in communication with the CPU and a program data stored in the data storage medium for execution by said CPU. The program data in each routing protocol computing entity implements different or the same routing protocols. This routing layer architecture is highly scalable.

47 Claims, 4 Drawing Sheets

OTHER PUBLICATIONS

Perlman R: "A Comparison Between Two Routing Protocols: OSPF and IS—IS" IEEE Network, IEEE Inc. New York, US, vol. 5, No. 5, Sep. 1, 1991, pp. 18-24, XP000248469 ISSN: 0890-8044.
Gobrial M N: "Evaluation of border gateway protocol (BGP) version 4 (V4) In the tactical environment" Military Communications Conference, 1996. Milcom '96, Conference Proceedings, IEEE McLean, VA, USA Oct. 21-24, 1996, New York, NY, USA, IEEE, US, Oct. 21, 1996, pp. 490-495, XP010203901 ISBN: 0-7803-3682-8.
International Search Report PCT/CA02/01181, Aug. 22, 2003.

* cited by examiner

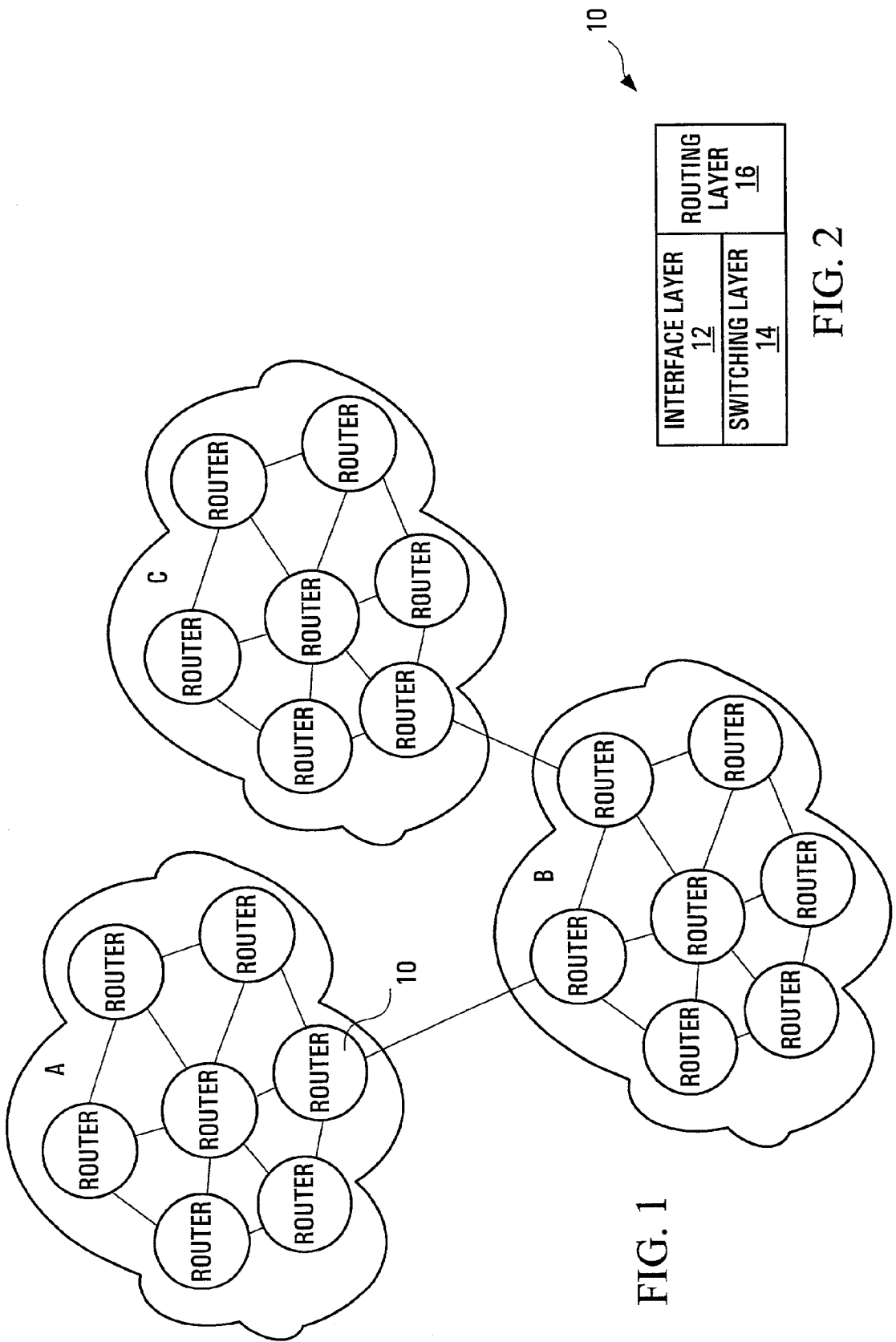

SCALABLE ROUTER

FIELD OF THE INVENTION

The present invention relates to a router having a novel architecture.

BACKGROUND OF THE INVENTION

Commercially available routers used in data networks are typically comprised of an interface layer defining a plurality of Input/Output (I/O) controllers implementing respective I/O ports, a switching layer that establishes signal pathways between the I/O ports, and a routing layer. The routing layer is responsible for communicating with other routers in the data network. Such peering communication sessions are conducted according to a routing protocol, and their purpose is to exchange route information.

The routing layer is implemented in software executed by a computing entity. The computing entity includes a Central Processing Unit (CPU) and a data storage medium that holds the program instructions executed by the CPU to implement the routing layer functionality.

An increase of the capacity of the routing layer, in terms of augmenting the number of simultaneous peering sessions that can be established, faster processing of the route information, etc., can be effected by increasing the speed of the CPU and providing a larger data storage medium. However, this approach provides a limited solution only and from a practical perspective can yield modest capacity increases at best. Therefore, there is a clear need in the industry to develop novel architectures for a router that are highly scalable.

SUMMARY OF THE INVENTION

In one broad aspect, the invention provides a router with a routing layer that supports multiple routing protocols. The routing layer has at least two routing protocol computing entities, namely first and second routing protocol computing entities. Each routing protocol computing entity includes a CPU, a data storage medium in communication with the CPU, and a program data stored in the data storage medium for execution by said CPU. The program data in each routing protocol computing entity implements a different routing protocol.

This routing layer architecture is highly scalable because of a reduction in the interdependence between the routing protocols. Support for a new routing protocol can be added by providing a new routing protocol computing entity. Such upgrade does not affect negatively existing routine protocols because the processing power and storage capacity allocated to the existing protocols are not shared with the new protocol. In addition, if the capacity of an existing routing protocol needs to be increased, that protocol can be run on several independent computing entities. This allows expanding the routing layer to meet future needs without any basic redesign of its architecture.

In a second broad aspect, the invention provides a router with a routing layer that supports at least one routing protocol. The routing layer has at least two routing protocol computing entities, namely first and second routing protocol computing entities. Each routing protocol computing entity includes a CPU, a data storage medium in communication with the CPU and a program data stored in the data storage medium for execution by the CPU. The program data in each routing protocol computing entity implements a common routing protocol.

Under a first example of implementation, the common routing protocol is a Distance Vector (DV) routing protocol. The routing protocol of the first routing protocol computing entity can establish peering sessions with a first set of remote routing devices while the routing protocol of the second routing protocol computing entity can establish peering sessions with a second set of remote routing devices, where the first set is different from the second set.

Under a second example of implementation, the common routing protocol is a Link State (LS) routing protocol. The routing protocol of the first routing protocol computing entity can establish peering sessions with remote routing devices from a first area, while the routing protocol of the second routing protocol computing entity can establish peering sessions wit remote routing devices from a second area.

In a third broad aspect, the invention provides a router where at least some of the tasks performed under a peering session are carried out at the interface layer level to reduce the amount of processing overhead in the routing layer. For instance, at least one of the I/O controllers of the interface layer implements a peering session assist module. The peering session assist module can effect some of the tasks of the peering session autonomously from the routing layer. In a specific example of implementation, those tasks are lower-level tasks that do not require substantial processing from the routing layer. Examples include the task of monitoring the integrity of the connection with the remote routing device by supervising the reception of keepalive or equivalent messages from the remote routing device and sending keepalive messages to the remote routing device. As long as the connection is sound, no notification is sent to the routing layer. However, if the connection is broken, then the routing layer is advised of this event. Another example of a lower-level task that can be carried out by the peering session assist module is the authentication of the remote routing device.

In the case when the peering session assist module encounters a situation that it cannot handle, the information is passed to the routing layer that performs the necessary task. An example is a situation when the remote routing device sends new route information.

Under a fourth broad aspect, the invention provides a router with a routing layer managing peering session under a LS routing protocol To reduce the processing overhead of the routing layer, each I/O controller of the interface layer implements a Link State Advertisement (LSA) entity The LSA entity includes an LS database for that peering session. The LSA entity can perform LSA flooding autonomously from the routing layer. For example, when the LSA entity receives an LSA message from a remote routing device, the LSA entity verifies if this is new information and, in the affirmative, updates the local LS database, forwards the LS information to the routing layer and to every other I/O controller such that the local LS database can also be updated In this specific example, when an I/O controller receives from another I/O controller LS information, the receiving I/O controller sends an LSA message to the remote routing device to which it is connected.

The storage of the LS database at two or more separate locations, in the routing layer on one hand, and in the interface layer on the other hand, creates a robust system where the LS database can be rebuilt when an operational failure occurs and a backup component (in the routing layer for instance) is put on line. The backup component needs to copy the LS database from the interface layer that is still operational such as to restore functionality to the layer that has suffered the operational failure.

In a fifth broad aspect, the invention provides a router with a routing layer including a plurality of routing protocol computing entities for managing peering sessions according to different or common routing protocols. A local routing table is stored in each routing protocol computing entity. The routing layer also includes a control computing entity that stores a master routing table derived from the local routing tables of the routing protocol computing entities. The routing layer also includes a backup computing entity. If the control computing entity suffers from an operational failure, the backup computing entity is activated and downloads the local routing table from each routing protocol computing entity in order to re-build the lost master routing table.

In a sixth broad aspect, the backup computing entity acts as a spare to any one of the routing protocol computing entities. The information placed in the master routing table associates the various route entries with the identity of the routing protocol computing entity from which each originates. Accordingly, when a routing protocol computing entity suffers from an operational failure, the backup computing entity is activated and the information that originally came from the failed unit is extracted from the master routing table such as to restore the local routing table in the spare, thus bringing the spare to full functionality.

BRIEF DESCRIPTION OF THE DRAWINGS

A detailed description of examples of implementation of the present invention is provided herein below with reference to the following drawings, in which:

FIG. 1 is a diagram of a data network;

FIG. 2 is a high-level functional block diagram of a router;

Figure 3:
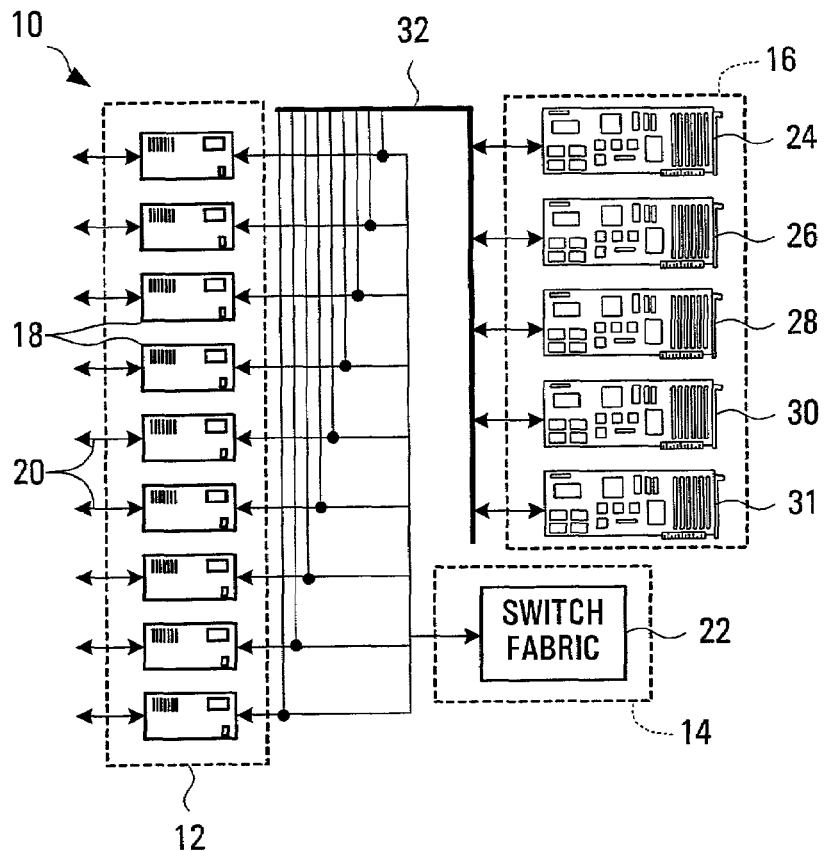
FIG. 3 is a more detailed diagram of the router shown in FIG. 2.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

FIG. 1 is a diagram of a data network. The data network includes three sub-networks A, B and C, where each sub-network constitutes an Autonomous System (AS). The sub-networks A, B and C are independent from an administrative point of view. Each sub-network A, B and C may be managed and maintained by a different corporate entity, such that data traffic passing through one sub-network is subjected to rules and policies that are proper to that sub-network.

Each sub-network A, B and C includes a plurality of routers that link network nodes (not-shown for simplicity) to one another. At least one router in each sub-network connects to a router in an adjacent sub-network to allow data traffic to be transported from one sub-network to another one. The router 10 in the sub-network A is an example of such a router.

FIG. 2 is a high-level functional block diagram of the router 10. The router has an interface layer 12. The interface layer 12 includes a plurality of Input/Output (I/O) controllers, where each I/O controller connects with a signal transmission medium, such as metallic conductors optical fiber, radio frequency channel or any other, allowing to receive or forward data traffic to a remote destination.

The router 10 also includes a switching layer 14 in the form of a switch fabric that selectively establishes signal pathways between the I/O controllers. The structure and operation of the switch fabric will not be described here because they are well known to those skilled in the art.

The router 10 also includes a routing layer 16. The routing layer 16 is responsible for establishing peering sessions with remote routing devices that can be routers similar to the router 10. Any number of peering sessions may be active at any given time. During a peering session, the router will advertise route information to remote routing devices or receive route information from remote routing devices. Peering sessions are conducted according to a routing protocol. Different routing protocols are in current use today. Examples include:

1. Border Gateway Protocol CROP). Under this protocol, the router 10 communicates with a remote routing device over a Transport Control Protocol/Internet Protocol (TCP/IP) connection Typically, BGP is used to exchange route information with routing devices residing in different sub-networks. BGP is in a class of routing protocols known as Distance Vector (DV) protocols.
2. Open Shortest Path First (OSPF). OSPF is an IP based protocol designed to be run mainly internal to a sub-network OSPF is in a class of routing protocols known as Link State (LS) protocols;
3. Routing Information Protocol (RIP), RIP is a User Datagram Protocol (UDP) designed to be run mainly internal to a sub-network. RIP is in a DV class of routing protocols;
4. Intermediate System to Intermediate System (IS-IS) protocol IS-IS is another LS protocol. It is network protocol independent and can be run over IP or another communication protocol.

For details on a particular routing protocol, the reader can refer to the relevant widely available technical literature.

The routing protocols listed above are merely examples. The scope of this invention should not be limited to the use of any particular routing protocol or combination of routing protocols.

The present description uses the expression "peering session" in a broad sense with the intent to encompass the communication of route information from one router to another router, irrespective of the routing protocol used. Thus, "peering sessions" will be used in conjunction with routing protocols of the DV class or with routing protocol of the LS class.

The block diagram of FIG. 3 illustrates the router 10 in greater detail. The interface layer 12 includes a plurality of I/O controllers 18 connecting with respective signal transmission media, such as optical fibers 20. Such signal transmission media transport data exchanged between the router 10 and the remote routing devices. Each I/O controller 18 implements at least one I/O port of the router 10. In addition, the I/O controller 18 also has a data tic forwarding processor and an I/O processor, which will be described later.

The I/O controllers 18 connect to a switching fabric 22, which in this example implements the switching layer 14. The switching fabric 22 selectively establishes signal pathways between the various I/O controllers 18 such that data traffic received at one I/O port of the router 10 can be forwarded to any other I/O port.

The routing layer 16 includes a plurality of computing entities. In this example, the routing layer 16 has three routing protocol computing entities 24, 26 and 28, a control computing entity 30 and a backup computing entity 31. It is should be expressly noted that the number of routing protocol computing entities, the number of control computing entities and the number of backup computing entities in the router can vary without departing from the spirit of He invention. All the computing entities 24, 26, 28, 30 and 31 connect to a data bus 32, which in turn connects to the individual I/O controllers 18. The data bus 32 allows the computing entities 24, 26, 28, 30 and 31 to communicate with one another, with the I/O controllers 18 and with remote routing devices through the I/O ports of the interface layer 12.

Figure 4:
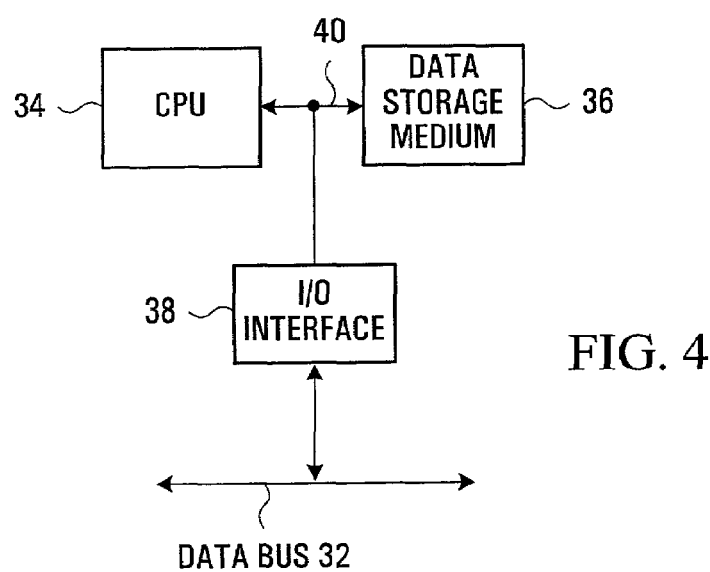
FIG. 4 is a block diagram of a routing protocol computing entity of the router shown in FIGS. 2 and 3.

The structure of each computing entity 24, 26, 28, 30 and 31 is shown at FIG. 4. The computing entities 24, 26, 28, 30 and 31 include a Central Processing Unit 34, a data storage medium 36 and an Input/Output (I/O) interface 38 all connected to one another by a local data bus 40. The data storage medium 36 includes generally two parts, one for holding program data for execution by the CPU 34 and one for holding other data such as data that the CPU 34 processes when executing the program data. The specific physical implementation of the data storage medium 36 is not essential to the present inventive concept.

The routing computing entities 24, 26 and 28 manage peering sessions according to specific routing protocols. The routing computing entity 24 runs a BGP protocol, the routing computing entity 26 runs an OSPF routing protocol and the routing computing entity 28 runs an IS-IS routing protocol This is merely an example, as many other protocol combinations can be used without departing from the spirit of the invention.

The distribution of the routing protocols over several computing entities provides a highly scalable router architecture.

The control computing entity 30 holds a master routing table and implements a routing table manager. The master routing table holds global route information collected from individual routing protocol computing entities 24, 26 and 28. The routing table manager performs various route calculations and distribution of route information among routing protocol computing entities 24, 26 and 28 and forwarding processors of the individual I/O controllers 18. The structure and operation of the control computing entity 30 will be described in detail later.

The backup computing entity 31 acts as a replacement should any one of the computing entities 24, 26, 28 and 30 suffer an operational failure. Specifically, the data storage medium 36 of the backup computing entity 31 contains program data to implement the functions of anyone of the computing entities 24, 26, 28 and 30. In the case of an operational failure of any one of the computing entities 24, 26, 28 and 30, the backup computing entity 31 identifies which computing entity has failed and then activates the software of the failed entity. In a second step, the backup computing entity 31 will re-build lost data, such as the local routing table or the master routing table. The operation of the backup computing entity 31 will be described in detail later.

Figure 5:
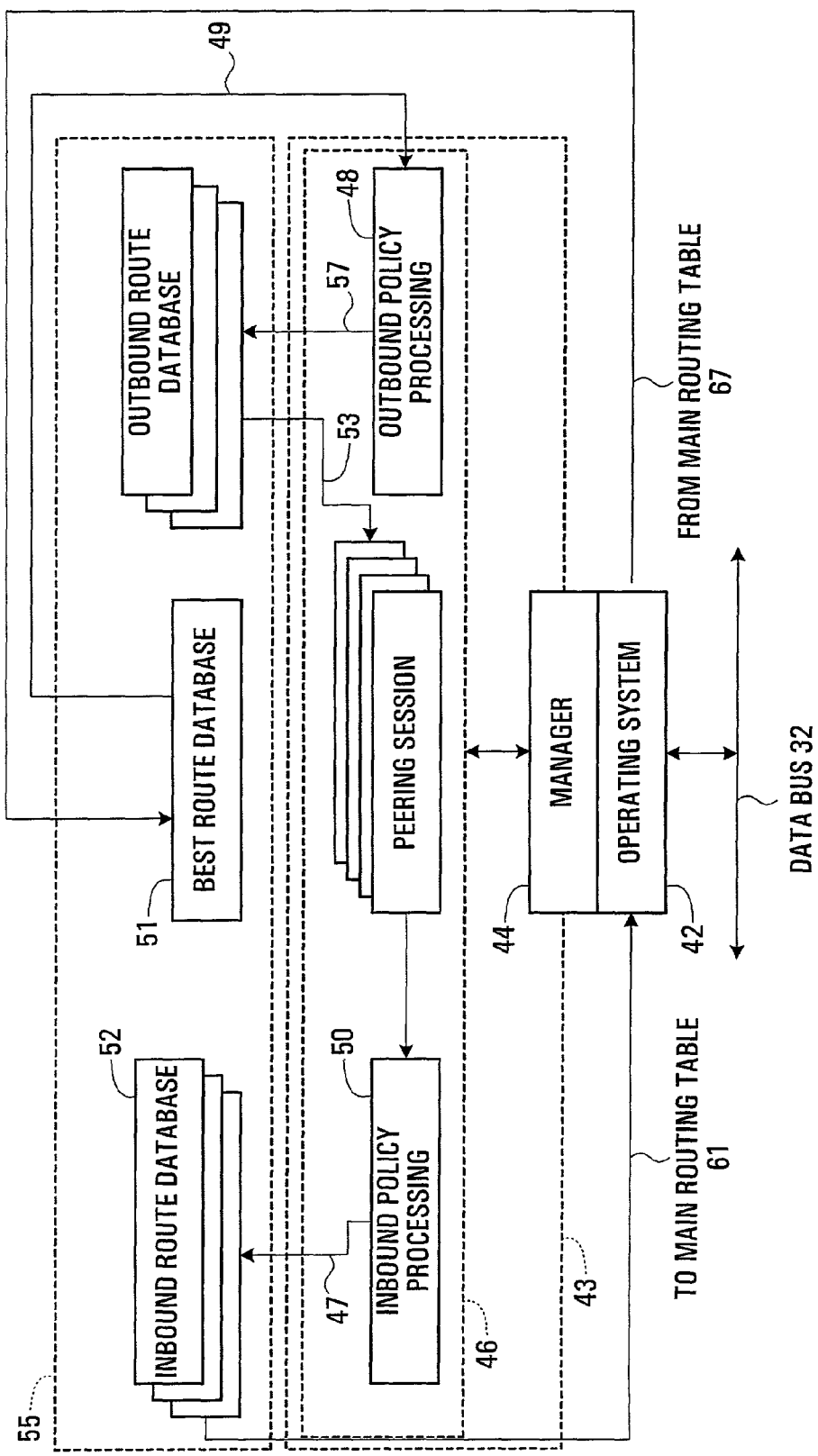
FIG. 5 is a block diagram illustrating the architecture of a program element executed by a routing protocol computing entity to implement a routing protocol.

The architecture of the program that manages peering sessions under the BGP routing protocol is shown in FIG. 5. For the sake of this example, assume that the program data is run on the routing protocol computing entity 24. The program data implements an operating system 42, which can be of any suitable type, designed to control allocation and usage of hardware resources during execution of the routing protocol. The operating system 42 also handles networking tasks necessary to perform message exchange with other computing entities and with the interface layer 12.

The various actions or functions performed according to the routing protocol are collectively designated by the reference numeral 43. Specifically, the routing protocol has a manager 44 controlling peering sessions 46 Any number of such peering sessions 46 can be active at any given moment. A given peering session 46 is comprised of several tasks. The execution of those tasks can be handled in at least two different ways. One of the possibilities is to execute all the tasks under a peering session 46 at the level of the routing protocol computing entity 24. The other possibility is to distribute the tasks. Some lower-level tasks are performed by the interface layer 12 while higher-level tasks are carried out by the routing protocol computing entity 24. One of the higher-level tasks is the inbound policy processing function 50. Another higher-level task is the outbound policy processing function 48. The inbound policy processing fictions process route information sent from a remote routing device to the router 10. Typically, this route information includes information about the various destinations to which the routing device (sender of the route information) has access and indicates which ones are preferred. Those preferences are established from the standpoint of the administrator of the remote routing device and may not be relevant for the administrator of the router 10. In particular, the administrator of the router 10 may wish to apply an entirely different set of rules that dictate which routes becomes preferred. Thus, the inbound policy processing function 50 subjects the incoming route information to a series of operations or processes designed to conform the route information to local preferences and rules. Those preferences and rules are made to suit the specific requirements of the administrator that manages the router 10 and are thus highly customizable. The inbound policy processing 50 can be peer session specific or common to all peer sessions.

The results of the inbound policy processing 50 are stored in an inbound route database 52, located in the data storage medium 36. This operation is illustrated by arrow 47. It will be noted that several inbound route databases 52 exist, there being one inbound route database 52 per peering session.

The outbound policy processing 48 is somewhat analogous to the inbound policy processing 50. The outbound policy processing filters route information that is available within the router 10, before advertising this route information to remote routing devices. The purpose of the outbound policy processing 48 is primarily of administrative nature. External routing devices may not need to be advised of certain routes within the sub-network A or about the fact that certain routes are preferred over other routes The filtering performed by the outbound policy processing 48 removes this information and/or adds additional route information that the remote routing devices should possess. The outbound policy processing 48 can be peer session specific or common to all peer sessions.

As with the inbound policy processing 50, the outbound policy processing 48 is highly customizable in the sense that the administrator of the sub-network will establish the rules and procedures of the outbound policy processing 48. Those rules and procedures are likely to vary significantly from one sub-network to anther sub-network.

The outbound policy processing function 48 is applied on route information held in a best route database 51, as shown by the arrow 49. The best route database 51 is created at least partially from the inbound route database 52, as it will be described later.

The results of the outbound policy processing 48 are stored in an outbound route database 54, located in the data storage medium 36 This is illustrated by arrow 57 As in the case with the inbound route database 52, there are several outbound route databases 54, one per peering session.

During a peering session 46, when the router 10 needs to advertise route information to a remote routing device, the route information contained in the respective outbound route database 54 is the data being sent, as illustrated by the arrow 53.

The inbound route databases 52, the best route database 51 and the outbound route databases 54 form the local routing table 55. This table is maintained in the data storage medium 36.

The structures of the program data for the other routing protocols run by the router 10 are similar to the BGP routing protocol described earlier and for that reason they will not be described in detail here. For additional information, the reader is invited to refer to the relevant technical literature describing how the routing protocols work.

Figure 6:
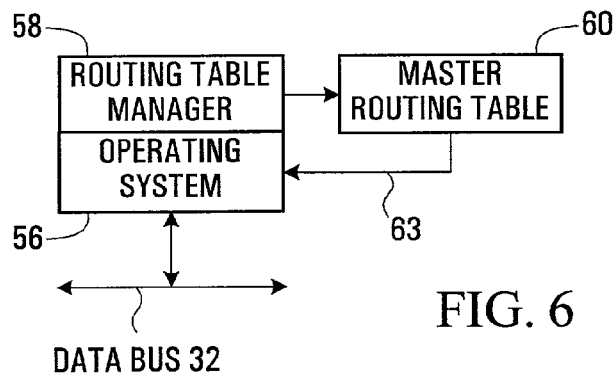
FIG. 6 is a block diagram illustrating the architecture of a program element executed by a control computing entity to implement a routing table manager.

The control computing entity 30 manages a master routing table. The structure of the program data in the control computing entity is shown at FIG. 6. The program data implements an operating system 56 which may be the same or different from the operating system 42. The program data also implements a routing table manager 58 that has three main functions. The first main fiction is to collect from each routing protocol computing entity 24, 26 and 28 Me routing data stored in the respective inbound route databases 52. This function is illustrated in FIG. 5 by the arrow 61. This data transfer is effected over the data bus 32. The second main function is to process the received routing data More specifically, the first step of second function is to merge the routing data received from the routing protocol computing entities 24, 26 and 28 to produce merged routing data. The merged routing data may be stored in any suitable format, without departing from the spit of the invention. The merged routing data has a plurality of entries, where each entry relates to route information and has attributes associated with it. One of those attributes is the preference of the routes. Optionally, each entry may also be tagged with the identifier of the particular inbound route database 52 that was the source of the entry. This option provides data redundancy and allows reconstructing the inbound route databases 52 of any one of the routing protocol computing entities 24, 26 or 28 in the case of an operational failure.

The merged routing data is stored in a master routine table 60 held in the data storage medium 36.

If storage space on the controller computer entity 30 is an issue, the merged routing data can be pruned to reduce space requirements Many pruning algorithms can be used without departing from the spirit of the invention. One possibility is to order the various routes, for each destination, in terms of preference. Only the first X number of routes in the list are retained and the rest is discarded. The value of X is set by the administrator of router 10.

The third function of the routing table manager 58 is to distribute the master routing data (pruned or not pruned) from the master routing table 60 to the routing protocol computing entities 24, 26 and 28 and to the individual I/O controllers 18. The transfer of the master routing data is effected over the data bus 32, as shown by the arrow 63 in FIG. 6. The master routing data received by each routing protocol computing entity 24, 26 and 28 is stored in the local routing table 55, specifically, in the best route database 51, as shown by the arrow 67 in FIG. 5. At this point, the outbound policy processing function 48 is invoked, as shown by the arrow 49. As indicated previously, the results of the outbound policy processing 48 are stored in the outbound routing database 54. Since the master routing data that is furnished to each routing protocol computing entity 24, 26 and 28 is the same, the outbound routing databases 54 will have identical content, assuming identical outbound policy processing 48.

It should be noted that the transfer of routing data between the routing protocol computing entities 24, 26 and 28, and the control computing entity 30 could be made, either one entry at a time or as a block of multiple entries.

Figure 7:
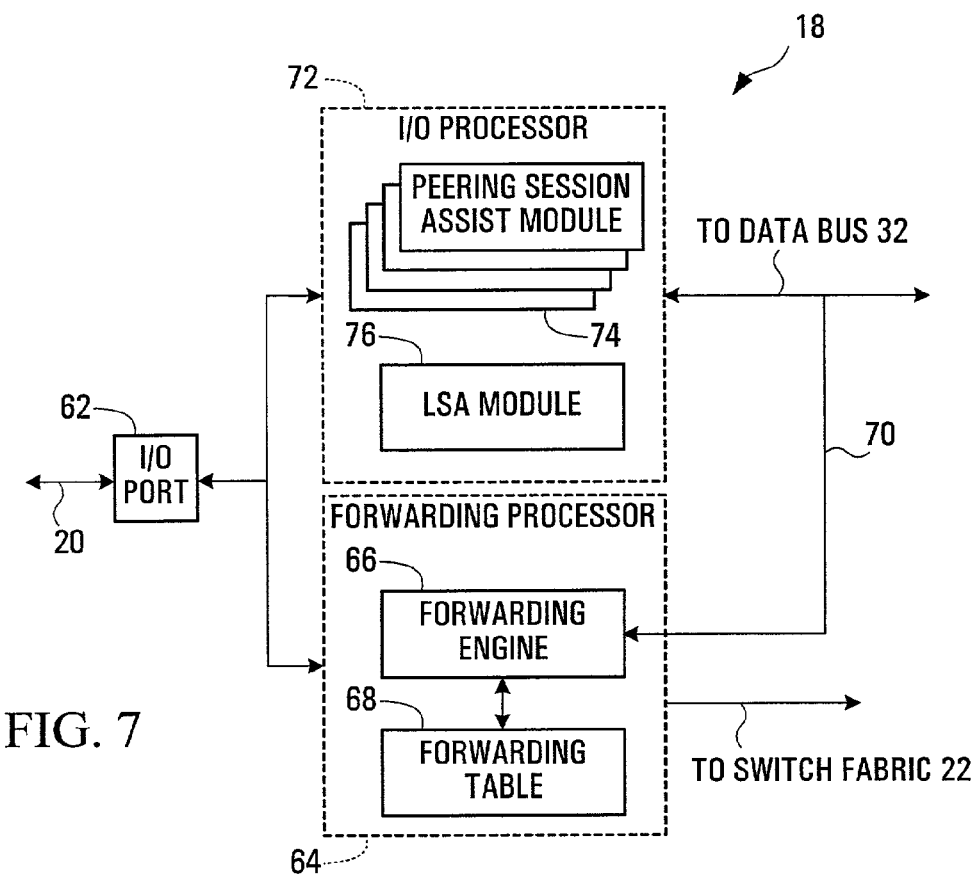
FIG. 7 is a block diagram of an I/O controller.

With reference to FIG. 7, each I/O controller 18 includes an I/O port 62 at which data traffic is received from remote routing devices and from which data traffic is sent to remote routing devices.

The I/O controller 18 also includes a forwarding processor 64 having a forwarding engine 66 communicating with a forwarding table 68. When the I/O port 62 receives data traffic, say an IP data packet, the data packet is passed to the forwarding engine 66. The forwarding engine performs a lookup operation in the forwarding table 68 to identify the I/O port of the router 10 through which the data packet will be released. Then, the forwarding engine 66 will release the data packet to the switch fabric 22 such that the data packet can be delivered to the desired I/O port. In the case when the data packet is to be released through the I/O port 62 through which it came earlier, the forwarding engine 66 then redirects the data packet back to the I/O port 62 without interaction with the switch fabric 22.

The contents of the forwarding table 68 are obtained from the master routing table 60. More specifically, when new master routing data is generated, after the second function of the routing table manager has been completed, the master routing data is sent to each routing protocol computing entity 24, 26 and 28 and to each I/O controller 18 to update the local forwarding table 68. This data transfer is illustrated by arrow 70.

The I/O controller 18 also includes an I/O processor 72 that reduces the CPU overhead in the various routing protocol computing entities 24, 26 and 28. The I/O processor 72 performs several functions that are implemented in software, hardware of a combination of software or hardware. In the case of a software implementation, the platform shown in FIG. 4 can be used.

As mentioned previously, a peering session is a collection of tasks. Generally, those tasks can be broken down in two main categories, namely lower-level tasks and higher-level tasks. Examples of higher-level tasks include the inbound policy processing 50 and the outbound policy processing 48. In the example of implementation shown at FIG. 7, some of the lower-level tasks are performed by peering session assist modules 74. Each peering session assist module 74 is an entity implemented in software, hardware or a combination of software and hardware associated with a peering session managed by any one of the routing protocol computing entities 24, 26 and 28. Three possible examples of lower-level tasks that a peering session 74 can perform is monitoring the state of a connection with the remote routing device with which the peering session is conducted, performing authentication, and transmission error control, among many other possibilities. All messages exchanged between the routing protocol computing entity 24, 26 and 28 and the remote routing device pass or are available to the peering session assist module 74. In the case of the connection monitoring task, the peering station assist module 74 is responsible for supervising the reception of keepalive, hello or equivalent messages received from the remote routing device. When those messages are received in a timely fashion, the peering session assist module 74 will autonomously send keepalive messages such as to maintain the connection and the peering session active. As for the authentication task, the peering session assist module 74 will implement any suitable authentication algorithm or procedure, without intervention by the routing protocol computing entity 24, 26 and 28. Such authentication procedure may involve password verification (for messages received from the remote routing device) and/ or password insertion in messages sent to the remote routing device, decryption of messages received from the remote routing device and encryption of messages received from the remote routing device. The transmission error control involves primarily re-transmission of lost messages. This task is particularly unsell in the case of OSPF that does not rely on the TCP/IP protocol (in contrast to BGP for example), which offers inherent packet re-transmission capabilities.

When the peering session assist module 74 receives messages from the remote routing device that require an action other than connection maintenance or authentication, those messages are passed to the remote routing device 24, 26 and 28 over the data bus 32. This data transfer can be made by forwarding the message as received from the remote routing device or re-formatting the message. In addition to this message passing capability, the routing protocol computing entity 24, 26 and 28 and the associated peering session assist module 74 can send to one another control messages to notify each other of events or conditions. For instance, when the peering session assist module 74 notes that the connection has dropped, it sends a control message to the routing protocol computing entity 24, 26 and 28 to signal the event. The routing protocol computing entity 24, 26 and 28 handles the event appropriately, for instance by initiating a new peering session.

It will be apparent to the reader skilled in the art that the distribution of tasks under a peering session between the peering session assist module 74 and the routing protocol computing entity 24, 26 and 28, can vary greatly depending on many factors. Accordingly, the scope of the present invention should not be limited to the example of distribution described earlier since many more possibilities exist.

The I/O processor 72 also comprises LSA modules 76 that handle specific lower-level tasks in the case of peering sessions effected under LS protocols. As in the case of the peering session assist modules 74, the LSA modules 76 can be implemented in software, hardware of a combination of software or hardware.

An LSA module 76 performs Link State Flooding (LSF). Each LSA module 76 is associated with a given LS area. On each I/O controller 18 there are as many LSA modules 76 as there are LS areas associated with that I/O controller 18. In most cases, there will be one LSA module per I/O controller 18. An exception will arise in conjunction with the IS-IS protocol, which may require more than one LS table per area.

Every LSA module 76 holds an LS table for the area associated with the LSA module. The LSA module also has processing logic to perform the following operations:

1. When an LS update message sent by a remote routing device is received at the I/O port 62, the LSA module 76 will check the validity of the LS update message by determining if it is new information. This is carried out by a lookup operation in the LS table.
2. If the LS update message is new, then the LSA module 76 will update its own table;
3. The LSA module 76 will then send an internal message over the data bus 32 to every other LSA module 76 associated with the relevant area, such that the other LSA modules 76 can update their own tables, if necessary;
4. The LSA module 76 will send an internal message over the data bus 32 to the routing protocol computing entity 26 and 28 such that its LS table can also be updated;
5. Finally, each LSA module 76 that has received the internal message will send out from the I/O port 62 an LS update message to the routing device with which the I/O port 62 connects.

Note that the above sequence of steps does not recite certain procedural requirements that may be needed such as message acknowledgement, error control, etc.

In this fashion, LSA flooding is performed autonomously which reduces the CPU overhead in the routing protocol computing entities 24, 26 and 28.

Referring back to FIG. 3, the routing layer 16 comprises a backup computing entity 31 that provides fault protection. The backup computing entity 31 is based on the platform shown at FIG. 4. If any one of the computing entities 24, 26, 28 and 30 suffers an operational failure, the backup computing entity can assume their function and maintain the router 10 operative.

Figure 8:
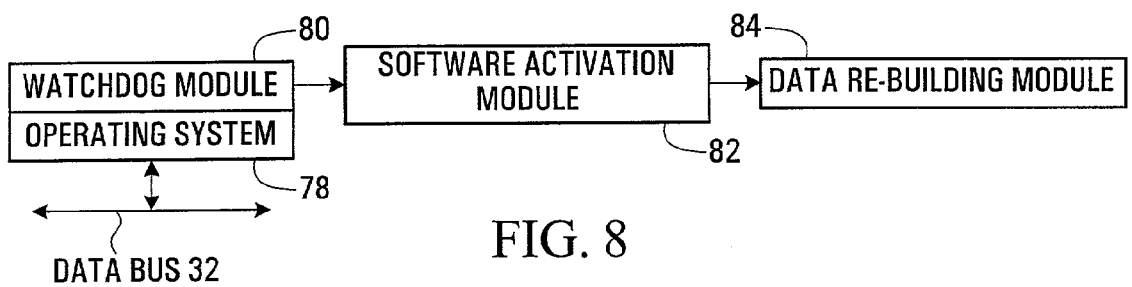
FIG. 8 is a block diagram illustrating the architecture of a backup computing entity.

FIG. 8 illustrates the architecture of they software stored in the data storage medium of the backup computing entity 31. The software has an operating system 78, a watchdog module 80, a software activation module 82 and a data re-building module 84. When the computing entities 24, 26, 28 and 30 are functioning properly the backup computing entity is in a standby mode. This means that the operating system is booted and the watchdog module 80 is running. The watchdog module 80 periodically sends messages to each computing entity 24, 26, 28 and 30. Those messages are intended to assess the sanity of each computing entity 24, 26, 28 and 30. As long as the computing entities 24, 26, 28 and 30 respond to the messages in a timely manner, they are assumed sane. When a computing entity 24, 26, 28 and 30 fails to respond, then it is assumed insane. At this point, the backup function activates. It is important to note that the invention should not be restricted the method of performing operational failure detection described earlier. Other methods are possible without departing from the spirit of the invention.

The software activation module 82 is invoked first. The task of the software activation module 82 is to identify and then run the software necessary to acquire the functionality of the failed computing entity 24, 26, 28 and 30. Based on the identity of the computing entity 24, 26, 28 and 30 that has failed to respond, the software activation module 82 determines from a lookup table the software load of the failed unit. Note that the data storage medium 36 is pre-loaded with all the software allowing the backup computing unit 31 to act as any one of the routing protocol computing entities 24, 26, 28 or the control computing entity 30. The lookup operation identifies only those programs that are required at this time Finally, the software activation module 82 invokes the software load that needs to be run.

The next step is to activate the data re-building module 84. The data re-building module 84 will re-construct the data tables lost in the failed computing entity 24, 26, 28 and 30. Assume that the routing protocol computing entity 24 is the one that failed. Three sets of databases need to be re-built, namely the inbound route databases 52, the best route database 51 and the outbound route databases 54. The best route database 51 is the route information that the control computing entity 30 generates. Through suitable massaging, the data re-building module 84 requests the information from the control computer entity 30 that sends it over the data bus 32.

Next, the data re-building module 84 invokes the outbound policy processing 54, which recreates the outbound route databases 54. Finally, the re-building module 84 sends messages to the control computing entity 30 to query the master routing table 60 for entries originating from the failed routing protocol computing entity 24. The result of the query, representing the inbound route databases 52 before the failure occurred, is sent over the data bus 32 to the backup computing entity 31. This operation will produce accurate results when the master routing table 60 has not been pruned. If the master routing table has been pruned, then the inbound route databases 52 can be re-built by conducting peering sessions with remote routing devices. Recall that the pruning operation of the master routing table 60 results in the loss of data, accordingly the accurate re-building of the inbound route databases 52 is not guaranteed when the master routing table has been pruned.

When an LSA database must be re-built, the information can be obtained from the I/O controller 18 associated with the relevant area, in particular from the LSA module 76, over the data bus 32.

When the control computing entity 30 has failed, the same steps described earlier are followed, with the exception that the software that is activated is the one for the routing table manager 58. The re-building of the master routing table 60 is effected by transferring from each routing protocol computing entity 24, 26 and 28 the contents of the local routing table 55 that were originally taken to construct the failed master routing table 60.

In the above example of implementation of the invention, each routine protocol is run on one computing entity. It is also possible to distribute one routing protocol over several computing entities. In this instance, the routing layer comprises at least two routing protocol computing entities, where each routing protocol computing entity runs the same protocol. Load sharing between the routing protocol computing entities can be effected in one or a combination of the following manners:

1. For DV protocols, on a remote routing device address basis. One of the routing protocol computing entities establishes peering sessions only with remote routing devices in a predetermined set. Peering sessions with routing devices that are not from the predetermined set are handled by the other routing protocol computing entity. For example, when a remote routing device initiates a peering session, the data is received by each routing protocol computing entity that notes the address of the remote routing device The routing protocol computing entity that is programmed to establish peering sessions with this address, will be the only one to respond. When a routing protocol computing entity has recognized the address of the remote routing device as being one in the list of addresses of remote routing devices with which it is authorized to conduct peering sessions, it notifies the other routing protocol computing entities. One of the routing protocol computing entities is designated as a default one. If, after a predetermined time interval, no one has claimed ownership over the peering session, the default computing entity will respond to the remote routing device. Under this embodiment, scalability is achieved by adding routing protocol computing entities dividing the population of remote routing devices among the routing protocol computing entities and designating one routing protocol computing entity as a default one;

2. For LS protocols, on an area basis. Each routing protocol computing entity handles routing data associated to one specific area, while another routing protocol computing entity handles routing data associated to a different area.

It is also possible to assign two or more areas to one routing protocol computing entity.

Although various embodiments have been illustrated, this was for the purpose of describing, but not limiting, the invention. Various modifications will become apparent to those skilled in the art and are within He scope of this invention, which is defined more particularly by the attached claims.

The invention claimed is:

1. A router supporting multiple routing protocols, said router comprising:
   a. an interface layer including a plurality of I/O controllers, each I/O controller implementing an I/O port;
   b. a switching layer in communication with said interface layer for selectively establishing signal pathways between said I/O ports; and
   c. a routing layer in communication with said interface layer, said routing layer including a plurality of routing protocol computing entities, each routing protocol computing entity being associated with a set of at least one routing protocol and including:
      i. a CPU; and
      ii. a data storage medium in communication with said CPU and storing program data for execution by said CPU to cause said routing protocol computing entity to effect management of one or more peering sessions with remote routing devices according to the at least one routing protocol in the set associated with said routing protocol computing entity, said management of one or more peering sessions comprising maintaining in said data storage medium information on a plurality of routes;
   wherein the set of at least one routing protocol associated with a first one of said routing protocol computing entities is different from the set of at least one routing protocol associated with a second one of said routing protocol computing entities;
   wherein the data storage medium of said first one of said routing protocol computing entities contains information on at least one route for which there is no information in the data storage medium of said second one of said routing protocol computing entities.

2. A router as defined in claim 1, wherein each routing protocol computing entity is operative to maintain simultaneously a plurality of peering sessions with remote routing devices.

3. A router as defined in claim 1, wherein each routing protocol computing entity is operative to exchange data with a remote routing device through said interface layer during a peering session.

4. A router as defined in claim 3, wherein the peering session includes a transfer of route information data from said router to the remote routing device.

5. A router as defined in claim 4, wherein the peering session includes a transfer of route information data from the remote routing device to said router.

6. A router as defined in claim 5, wherein the information on a plurality of routes maintained in the data storage medium of each of at least one of said routing protocol computing entities is held in a local routing table stored in said data storage medium and including at least one inbound route database derived at least in part from route information data transferred from a remote routing device to said router.

7. A router as defined in claim 6, wherein each of said at least one of said routing protocol computing entities is operative to apply an inbound policy processing on the route information data transferred from a remote routing device during generation of said at least one inbound route database.

8. A router as defined in claim 5, wherein the data storage medium of at least one of said plurality of routing protocol computing entities stores a local routing table that holds a best route database, said at least one routing protocol computing entity being operative to apply an outbound policy processing on its best route database to generate at least one outbound route database, said at least one routing protocol computing entity being operative to transfer route information data from its said at least one outbound route database to a remote routing device.

9. A router as defined in claim 1, wherein the information on a plurality of routes maintained in the data storage medium of each routing protocol computing entity is held in a local routing table stored in said data storage medium and including at least one inbound route database derived from route information data transferred from a remote routing device to said router.

10. A router as defined in claim 9, wherein each routing protocol computing entity is operative to apply an inbound policy processing on the route information data transferred from a remote routing device during generation of said at least one inbound route database.

11. A router as defined in claim 10, wherein the local routing table of each routing protocol computing entity holds a best route database, each routing protocol computing entity being operative to apply an outbound policy processing on the best route database of said local routing table of said routing protocol computing entity to generate at least one outbound route database, each routing protocol computing entity being operative to transfer route information data from said at least one outbound route database of said routing protocol computing entity to a remote routing device.

12. A router as defined in claim 11, wherein said routing layer includes a control computing entity in data communicative relationship with each routing protocol computing entity, said control computing entity including:
 a. a CPU; and
 b. a data storage medium in communication with said CPU of said control computing entity and storing program data for execution by said CPU of said control computing entity and a master routing table.

13. A router as defined in claim 12, wherein the program data stored in the data storage medium of said control computing entity implements a routing table manager for managing said master routing table.

14. A router as defined in claim 13, wherein each routing protocol computing entity is in communication with said control computing entity to transfer to the data storage medium of said control computing entity data from the at least one inbound route database in said routing protocol computing entity.

15. A router as defined in claim 14, wherein said routing table manager is operative to apply a master policy processing on data received from the at least one inbound route database in each routing protocol computing entity to generate the master routing table.

16. A router as defined in claim 15, wherein said master policy processing includes merging the data in the inbound route databases of said routing protocol computing entities to produce merged routing data.

17. A router as defined in claim 16, wherein the merged routing data includes information mapping destinations and routes to the destinations.

18. A router as defined in claim 17, wherein the merged routing data includes a plurality of destinations and a set of routes associated with each destination of the plurality of destinations, said master policy processing includes discarding from each set of routes a plurality of routes and retaining only a subset of the set of routes.

19. A router as defined in claim 18, wherein said control computing entity is operative to transfer to the data storage medium of a first one of said routing protocol computing entities at least a portion of the merged routing data to form the best route database in the data storage medium of said first one of said routing protocol computing entities.

20. A router as defined in claim 19, wherein said control computing entity is operative to transfer to the data storage medium of a second one of said routing protocol computing entities at least a portion of the merged routing data to form the best route database in the data storage medium of said second one of said routing protocol computing entities.

21. A router as defined in claim 12, wherein each I/O controller includes a forwarding processor, when a data packet is received at the I/O controller, said forwarding processor determining an I/O port of said interface layer through which the data packet is to be released, said forwarding processor including a data storage medium holding a forwarding table, said forwarding table including data derived from said master routing table.

22. A router as defined in claim 1, wherein the set of at least one routing protocol associated with a first one of said routing protocol computing entities contains BGP, and wherein the set of at least one routing protocol associated with a second one of said routing protocol computing entities contains OSPF.

23. A router as defined in claim 1, wherein the set of at least one routing protocol associated with each of said routing protocol computing entities contains exactly one routing protocol.

24. A router as defined in claim 1, wherein the set of at least one routing protocol associated with said first one of said routing protocol computing entities and the set of at least one routing protocol associated with said second one of said routing protocol computing entities are mutually exclusive sets.

25. A router as defined in claim 1, wherein the data storage medium of each routing protocol computing entity holds a local routing table storing an inbound routing database derived from route information data transferred from a remote routing device during a peering session managed by said routing protocol computing entity, wherein said routing layer includes:
 a control computing entity in data communicative relationship with each routing protocol computing entity, said control computing entity including:
   i. a CPU; and
   ii. a data storage medium in communication with the CPU of said control computing entity and storing:
     a master routing table holding a master routing database derived at least in part from the inbound routing database of each routing protocol computing entity; and
     program data for execution by the CPU of said control computing entity to implement a routing table manager to manage said master routing table;
 a backup computing entity in data communicative relationship with each routing protocol computing entity and with said control computing entity, said backup computing entity including:
   i. a CPU; and
   ii. a data storage medium in communication with the CPU of said backup computing entity and storing program data for execution by the CPU of said backup computing entity to cause said backup computing entity to be responsive to an operational failure of said control computing entity to:

1. download the inbound routing database of each routing protocol computing entity; and
2. rebuild the master routing database at least in part from the inbound routing database downloaded from each routing protocol computing entity.

26. A router as defined in claim 1, wherein the data storage medium of each routing protocol computing entity holds a local routing table storing an inbound routing database derived from route information data transferred from a remote routing device during a peering session managed by said routing protocol computing entity, wherein said routing layer includes:

a control computing entity in data communicative relationship with each routing protocol computing entity, said control computing entity including:
  i. a CPU; and
  ii. a data storage medium in communication with the CPU of said control computing entity and storing:
    a master routing table holding a master routing database derived at least in part from the inbound routing database of each routing protocol computing entity; and
    program, data for execution by the CPU of said control computing entity to implement a routing table manager to manage said master routing table;

a backup computing entity in data communicative relationship with each routing protocol computing entity and with said control computing entity, said backup computing entity including:
  i. a CPU; and
  ii. a data storage medium in communication with the CPU of said backup computing entity and storing program data for execution by the CPU of said backup computing entity to cause said backup computing entity to be responsive to an operational failure of a particular one of said routing protocol computing entities to:
    1. transfer information from said master routing table to the data storage medium of said backup computing entity to rebuild at least partially the local routing table of said particular one of said routing protocol computing entities; and
    2. cause said backup computing entity to effect management of one or more peering sessions with remote routing devices according to the at least one routing protocol in the set associated with said particular one of said routing protocol computing entities.

27. A router as defined in claim 1, wherein said router is operative for:
  merging routing data stored in the data storage medium of each of said routing protocol computing entities to produce merged routing data; and
  transferring at least a portion of the merged routing data to the data storage medium of each of said routing protocol computing entities.

28. A router as defined in claim 27, wherein the merged routing data includes data regarding destinations and routes for the destinations, including, for each of at least one of the destinations, a plurality of routes for that destination.

29. A router as defined in claim 28, wherein said router is operative for, prior to said transferring, pruning the merged routing data by retaining, for each destination, at most a set number of routes for that destination.

30. A router as defined in claim 29, wherein said pruning comprises pruning the merged routing data based on a preference attribute associated with each of the routes.

31. A router as defined in claim 27, wherein said routing layer includes a control computing entity in data communicative relationship with each of said routing protocol computing entities, said control computing entity including:
  a CPU; and
  a data storage medium in communication with said CPU of said control computing entity and storing program data for execution by said CPU of said control computing entity to cause said control computing entity to effect said merging and said transferring.

32. A router as defined in claim 27, wherein said transferring comprises storing the at least a portion of the merged routing data in a best route database maintained in the data storage medium of each said routing protocol computing entities.

33. A router, comprising:
  a. an interface layer including a plurality of I/O controllers, each I/O controller implementing an I/O port;
  b. a switching layer in communication with said interface layer for selectively establishing signal pathways between said I/O ports; and
  c. a routing layer in communication with said interface layer, said routing layer including a plurality of routing protocol computing entities, each routing protocol computing entity being associated with a routing protocol and including:
    i. a CPU; and
    ii. a data storage medium in communication with said CPU and storing program data for execution by said CPU to cause said routing protocol computing entity to effect management of one or more peering sessions with remote routing devices according to the routing protocol associated with said routing protocol computing entity, said management of one or more peering sessions comprising maintaining in said data storage medium information on a plurality of routes;
  wherein the routing protocol associated with a first one of said routing protocol computing entities is the same as the routing protocol associated with a second one of said routing protocol computing entities;
  wherein the data storage medium of said first one of said routing protocol computing entities contains information on at least one route for which there is no information in the data storage medium of said second one of said routing protocol computing entities.

34. A router as defined in claim 33, wherein the routing protocol associated with said first one of said routing protocol computing entities and the routing protocol associated with said second one of said routing protocol computing entities are distance vector protocols.

35. A router as defined in claim 33, wherein the routing protocol associated with said first one of said routing protocol computing entities and the routing protocol associated with said second one of said routing protocol computing entities are link state protocols.

36. A router as defined in claim 34, wherein the first one of said routing protocol computing entities is capable of establishing peering sessions with a first set of remote routing devices, the second one of said routing protocol computing entities is capable of establishing peering sessions with a second set of remote routing devices, the first set of remote routing devices excluding at least one routing device that belongs to the second set of routing devices.

37. A router as defined in claim 36, wherein the first set of remote routing devices excludes any remote routing device from the second set.

38. A router as defined in claim 37, wherein the first and the second sets of remote routing devices are mutually exclusive sets.

39. A router as defined in claim 35, wherein the first one of said routing protocol computing entities is capable of establishing peering sessions with remote routing devices from a first area, the second one of said routing protocol computing entities is capable of establishing peering sessions with remote routing devices from a second area, the first area being different from the second area.

40. A router as defined in claim 33, wherein the routing protocol associated with each of said first one of said routing protocol computing entities and said second one of said routing protocol computing entities is BGP.

41. A router as defined in claim 33, wherein the data storage medium of each routing protocol computing entity holds a local routing table storing an inbound routing database derived from route information data transferred from a remote routing device during a peering session managed by said routing protocol computing entity, wherein said routing layer includes:
   a control computing entity in data communicative relationship with each routing protocol computing entity, said control computing entity including:
      i. a CPU; and
      ii. a data storage medium in communication with the CPU of said control computing entity and storing:
         a master routing table holding a master routing database derived at least in part from the inbound routing database of each routing protocol computing entity; and
         program data for execution by the CPU of said control computing entity to implement a routing table manager to manage said master routing table;
   a backup computing entity in data communicative relationship with each routing protocol computing entity and with said control computing entity, said backup computing entity including:
      i. a CPU; and
      ii. a data storage medium in communication with the CPU of said backup computing entity and storing program data for execution by the CPU of said backup computing entity to cause said backup computing entity to be responsive to an operational failure of said control computing entity to:
         1. download the inbound routing database of each routing protocol computing entity; and
         2. rebuild the master routing database at least in part from the inbound routing database downloaded from each routing protocol computing entity.

42. A router as defined in claim 33, wherein the data storage medium of each routing protocol computing entity holds a local routing table storing an inbound routing database derived from route information data transferred from a remote routing device during a peering session managed by said routing protocol computing entity, wherein said routing layer includes:
   a control computing entity in data communicative relationship with each routing protocol computing entity, said control computing entity including:
      i. a CPU; and
      ii. a data storage medium in communication with the CPU of said control computing entity and storing:
         a master routing table holding a master routing database derived at least in part from the inbound routing database of each routing protocol computing entity; and
         program data for execution by the CPU of said control computing entity to implement a routing table manager to manage said master routing table;
   a backup computing entity in data communicative relationship with each routing protocol computing entity and with said control computing entity, said backup computing entity including:
      i. a CPU; and
      ii. a data storage medium in communication with the CPU of said backup computing entity and storing program data for execution by the CPU of said backup computing entity to cause said backup computing entity to be responsive to an operational failure of a particular one of said routing protocol computing entities to:
         1. transfer information from said master routing table to the data storage medium of said backup computing entity to rebuild at least partially the local routing table of said particular one of said routing protocol computing entities; and
         2. cause said backup computing entity to effect management of one or more peering sessions with remote routing devices according to the routing protocol associated with said particular one of said routing protocol computing entities.

43. A router comprising:
a. an interface layer including a plurality of I/O controllers, each I/O controller implementing an I/O port;
b. a switching layer in communication with said interface layer for selectively establishing signal pathways between said I/O ports; and
c. a routing layer in communication with said interface layer, said routing layer including a plurality of routing protocol computing entities, each routing protocol computing entity being associated with a set of at least one routing protocol and including:
   i. a CPU; and
   ii. a data storage medium in communication with said CPU and storing program data for execution by said CPU to cause said routing protocol computing entity to effect management of one or more peering sessions with remote routing devices according to the at least one routing protocol in the set associated with said routing protocol computing entity, said management of one or more peering sessions comprising maintaining in said data storage medium information on a plurality of routes;
   wherein the data storage medium of a first one of said routing protocol computing entities contains information on at least one route for which there is no information in the data storage medium of a second one of said routing protocol computing entities;
said router being operative for:
merging routing data stored in the data storage medium of each of said routing protocol computing entities to produce merged routing data, the merged routine data mapping destinations and routes for the destinations;
pruning the merged routing data to discard a first subset of the routes for the destinations and retain a second subset of the routes for the destinations; and
transferring at least a portion of the merged routing data that has been pruned to the data storage medium of each of said routing protocol computing entities.

44. A router as defined in claim 43, wherein said pruning comprises pruning the merged routing data based on a preference attribute associated with each of the routes.

45. A router as defined in claim 43, wherein said routing layer includes a control computing entity in data communicative relationship with each of said routing protocol computing entities, said control computing entity including:
- a CPU; and
- a data storage medium in communication with said CPU of said control computing entity and storing program data for execution by said CPU of said control computing entity to cause said control computing entity to effect said merging and said pruning.

46. A router as defined in claim 43, wherein the set of at least one routing protocol associated with said first one of said routing protocol computing entities is different from the set of at least one routing protocol associated with said second one of said routing protocol computing entities.

47. A router as defined in claim 43, wherein the set of at least one routing protocol associated with said first one of said routing protocol computing entities is identical to the set of at least one routing protocol associated with said second one of said routing protocol computing entities.

\* \* \* \* \*